May 22, 1962  J. SELZER  3,035,720
POWER ACTUATED END GATE ELEVATOR FOR MOTOR VEHICLES
Filed Aug. 12, 1959  3 Sheets-Sheet 1
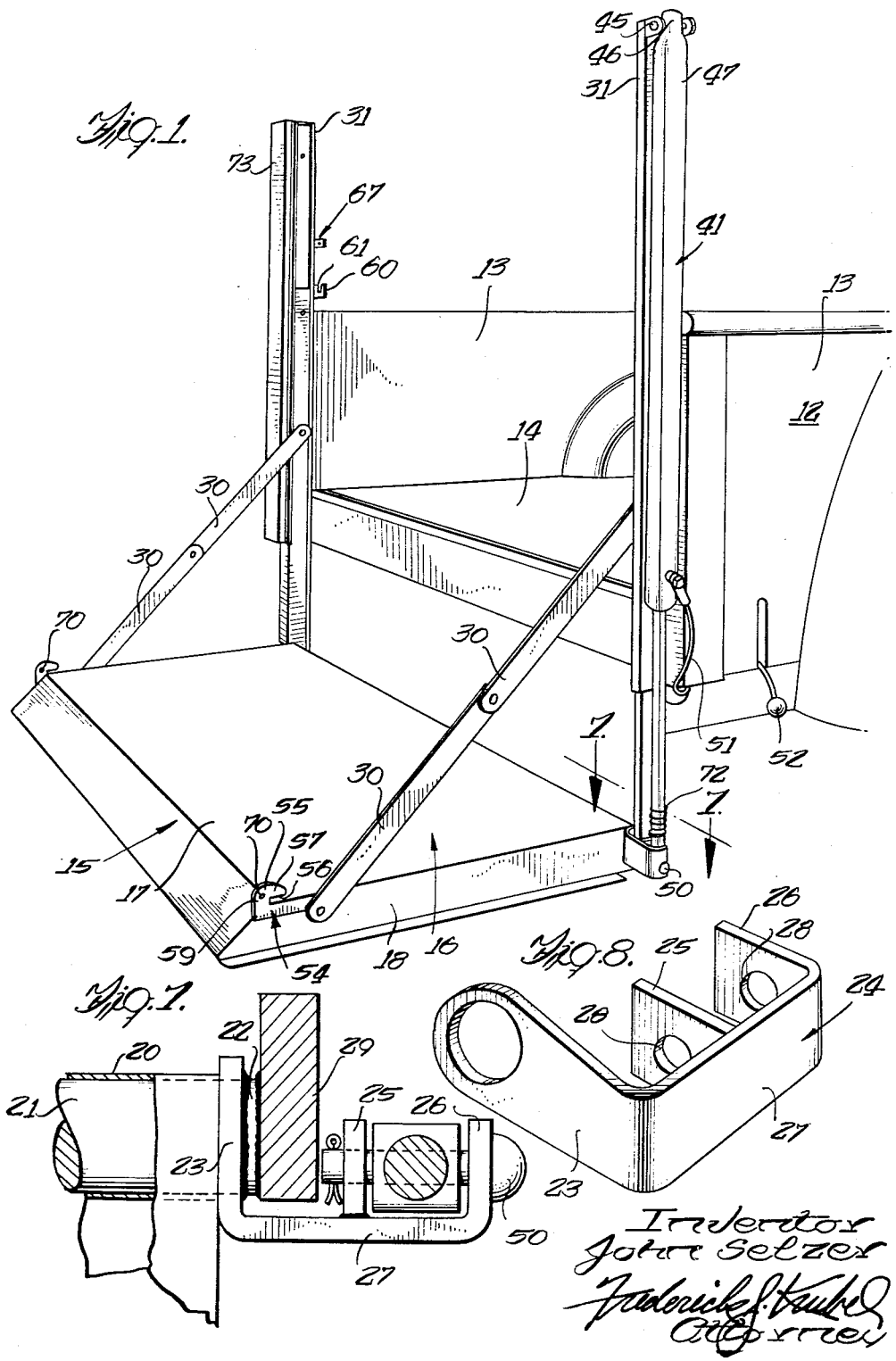

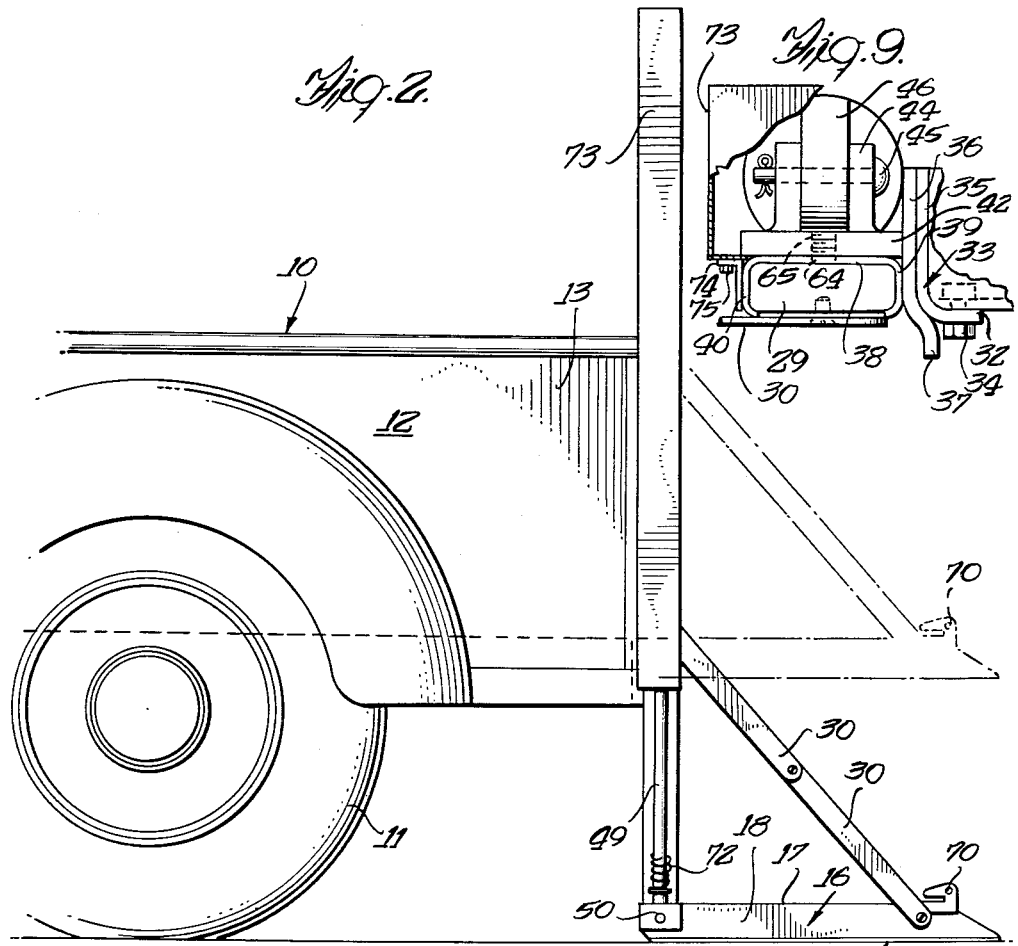

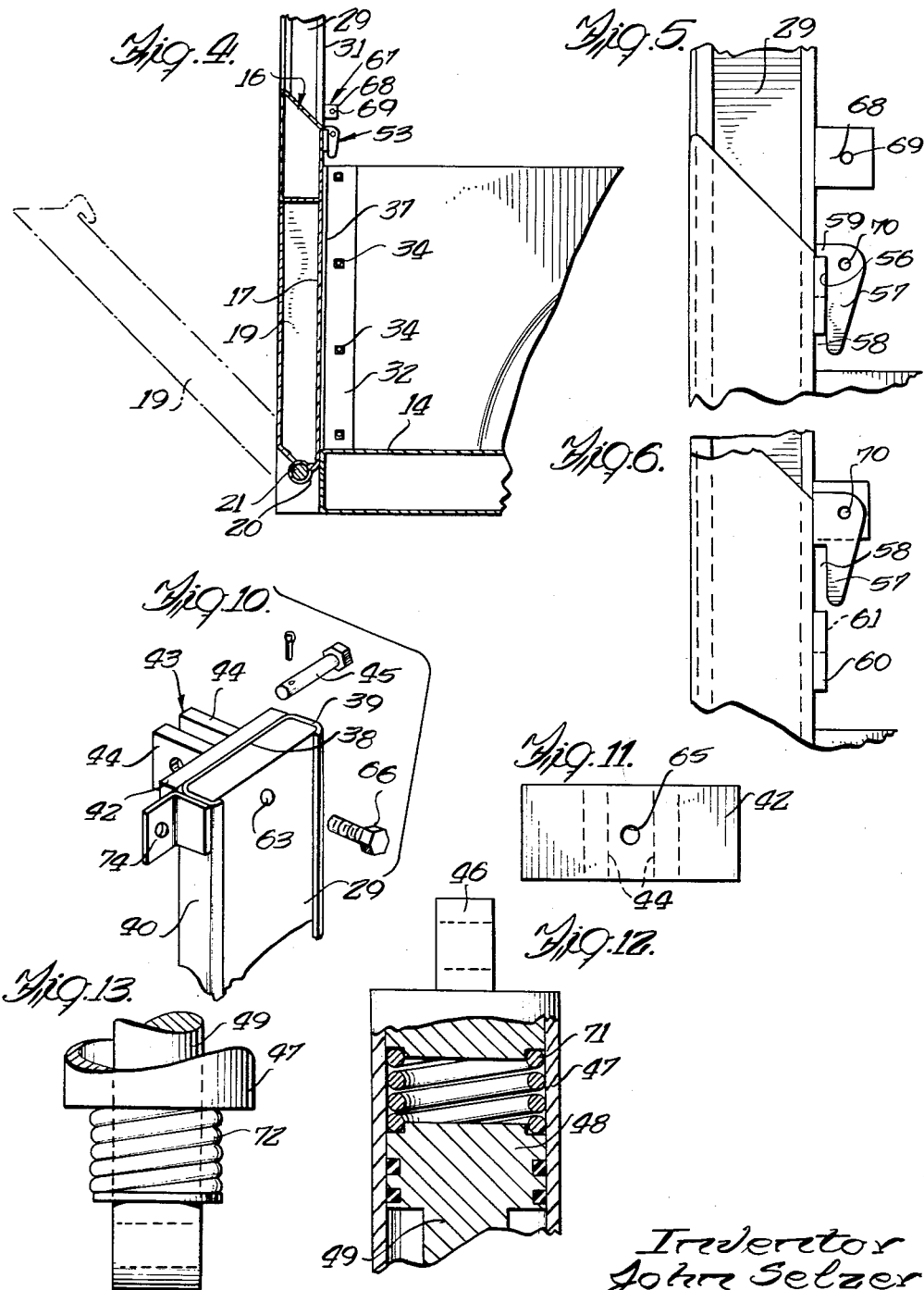

United States Patent Office 3,035,720
Patented May 22, 1962

3,035,720
POWER ACTUATED END GATE ELEVATOR
FOR MOTOR VEHICLES
John Selzer, 15021 Aboite Center Road, R.R. 6,
Fort Wayne, Ind.
Filed Aug. 12, 1959, Ser. No. 833,190
6 Claims. (Cl. 214—75)

This invention relates to power actuated end gate elevators for motor vehicles, and more particularly to a new and improved combination load carrying platform and end gate member, and means for moving the member vertically while disposed horizontally to facilitate loading and unloading of the vehicle body with which it is associated.

An important object of the present invention is the provision of a relatively light weight but sturdily constructed power actuated end gate elevator for motor trucks which may be readily and easily adapted to truck bodies of various manufacturers without the necessity of extensive modification of the motor trucks.

Still another object is to provide an inexpensive releasable lock means for locking the end gate elevator in its fully raised position.

A still further object is the provision of simple means for positively securing the load carrying and end gate member in an upright, body closing position in the event the power actuating means becomes inoperative.

A further object is to provide an end gate elevator which will not adversely affect the capability of the motor truck to haul loose material such as wheat, oats, sand, and the like in a grain-tight manner.

A still further object of the invention is to provide a compact, power actuated end gate elevator construction which permits the elevator to be manufactured completely as a unit in a factory and thereafter substituted readily for the conventional end gate of a motor vehicle body away from the factory.

A further objective is the provision of a load carrying platform and end gate member and a novel mechanism for actuating the member, which are built into a simple and complete package or unit, assembled at the factory, and including means for mounting the unit upon a truck body without the necessity of drilling holes or modifying the chassis frame of the motor truck as has usually been required heretofore.

The foregoing and other important objects and desirable features inherent in and encompassed by the invention, together with many of the purposes and uses thereof, will become readily apparent from a reading of the ensuing description in conjunction with the annexed drawings, in which, FIGURE 1 is a perspective view of the rear portion of a motor truck having the invention mounted thereon with the combination end gate and load-carrying platform thereof in its lowered, open position at ground level;

FIGURE 2 is a side elevational view of the end gate elevator structure shown in FIGURE 1; the raised, open position of the structure is shown in broken lines;

FIGURE 3 is a rear elevational view of the end gate structure in its raised and body enclosing position;

FIGURE 4 is a vertical sectional view taken substantially along line 4—4 of FIGURE 3; a partially open position of the end gate member is shown in broken lines;

FIGURE 5 is an enlarged fragmentary view of the interengaging parts of the releasable lock means;

FIGURE 6 is a view similar to FIGURE 5 showing the end gate member elevated with the exception that the end gate member is elevated slightly and the releasable lock means is unlocked;

FIGURE 7 is a horizontal sectional view taken substantially along line 7—7 of FIGURE 1;

FIGURE 8 is a perspective view of the bracket for interconnecting the end gate member, slide bar and power actuating means;

FIGURE 9 is a fragmentary plan view of the interconnecting parts on one side of the end gate elevator structure; certain parts have been cut away and others have been omitted to better illustrate the invention;

FIGURE 10 is an enlarged fragmentary perspective view, partly exploded, a portion of the positive lock means for the end gate member;

FIGURE 11 is a side elevational view of the bracket for interconnecting the guide and the upper end of one piston and cylinder assembly;

FIGURE 12 is an enlarged, fragmentary view of the piston and cylinder assembly partially broken away and in section; and FIGURE 13 is a fragmentary side elevational view of the lower end of one piston rod with the end gate member in its fully raised position.

Referring to the drawings in detail, wherein like reference characters represent like elements throughout the various views, the invention is shown in conjunction with a conventional pick-up type motor truck 10 which includes a chassis frame (not shown). The chassis frame, which comprises a pair of transversely spaced side sill members, is supported upon and driven by rear ground engaging wheels 11. A pick-up type body 12 is, in turn, supported by the chassis frame by means of transversely extending, longitudinally spaced cross bolsters interposed between and attached to the body 12 and the chassis frame. The truck body 12 has vertical side walls 13 interconnected by a floor or bed 14. The rear end of the body 12 is open and is adapted to be closed by a combination load carrying platform and end gate member, designated generally by numeral 15.

The combination load carrying platform and end gate member 15 is generally rectangular in shape and includes a relatively heavy metal sheet 16 formed to provide a load-supporting wall 17 and transversely spaced end walls 18. Four transversely spaced, elongated channel members 19 are welded to the underside of the wall 17 to strengthen the same and afford rigidity to the end gate member 15. The forwardmost edge of the end gate member 15, when in its open position as shown in FIGURE 2, is defined by a transversely extending cylindrical sheet metal member 20 which is welded to the walls 17, 18 and the reinforcing members 19 and serves as a bearing for a pivot shaft 21 extending therethrough.

The respective opposite ends 22 of the pivot shaft 21 project beyond the ends of the bearing-forming member 20 and each end 20 extends through and is welded to one leg 23 of a respective bracket 24, as shown in FIGURE 7. The brackets 24, as best illustrated in FIGURE 8, are each fabricated to provide three parallel and spaced legs 23, 25, and 26 interconnected by a transversely extending section 27. The legs 25 and 26 are shorter in length than the leg 23 and are each provided with a circular opening 28 transversely aligned with the opening 28 in the other leg.

The lower end of a vertically disposed slide bar 29 is disposed between the legs 23 and 24 of each bracket 24 and the outermost ends of the pivot shaft 21 are rigidly connected to the bars 29. Thus, it will be appreciated that the end gate member 15 is capable of pivoting about the longitudinal axis of the shaft 21 with respect to the brackets 24 and the vertical slide bars 29. As shown in FIGURE 1, two pairs of pivotally interconnected support links 30 are utilized to limit the pivotal movement of the end gate 15 in one direction. One end of each pair of links 30 is pivotally connected to a mid portion of a respective slide bar 29 and the opposite end is similarly connected to a respective end wall 18 of the end gate member 15. From the foregoing it will be appreciated that when the links 30 of each pair of support links are fully extended as shown in FIGURE 1 the end gate member 15 is fully opened and lies in a horizontal plane substantially parallel to the plane of the truck body floor 14.

The slide bars 29, which are substantially rectangular in horizontal cross section, are guided for vertical sliding movement in channel-like guide elements 31. Inasmuch as the guide element 31 and the structure associated therewith on one side of the truck body 12 is the same as on the other side, only the guide element and associated structure on one side will be described in detail. A vertical flange 32 of an L-shaped end gate mounting member 33 having a height substantially equal to the height of the side panel 13 of the truck body 12 is adapted to lie against the rearwardmost edge of the inner surface of the side panel 13. The lower end of the flange 32 rests upon the floor 14 and is fastened to the side panel 13 by means of vertically spaced bolt and lock nut means 34. Referring to FIGURE 9, it will be noted that the transversely extending leg 35 of the L-shaped mounting member 33 abuts the rearwardly facing surface of the side panel 13. A vertical, elongated plate 36, arranged back-to-back with the leg 35, is welded to the mounting member 33. The plate 36 is provided with a forwardly offset, inwardly extending projection 37, the purpose of which will be explained hereinafter. The projection 37 lies substantially in the vertical, transversely extending plane containing the leg 35 of the mounting member 33 and the rearwardmost edge of the truck body floor 14.

The web 38 of the guide element 31 is arranged to lie in a vertical longitudinally extending plane and the forwardmost flange 39 of the longitudinally spaced and parallel flanges 39 and 40 extending inwardly therefrom is rigidly secured, as by welding or the like, to the plate 36.

The power actuating means for elevating the end gate member 15 includes a pair of hydraulic piston and cylinder assemblies, each piston and cylinder assembly being designated generally by numeral 41 and being mounted on a respective guide element 31 in a manner that will be pointed out presently. Fixed to the web 38 of the uppermost end of each guide element 31 is the base plate 42 of a support bracket 43. The bracket 43 is provided with a pair of longitudinally spaced and parallel arms 44 rigidly secured and projecting from the base plate 42. The arms 44 carry a pivot pin 45 which extends through an aperture formed through a tab 46 integrally formed with the hydraulic cylinder 47 of the piston and cylinder assembly 41. A piston head 48 is slidably mounted within each cylinder 47 and has a piston rod 49 secured thereto. The piston rod 49 projects downwardly from the bottom end wall of the cylinder 47 and the lowermost end thereof is disposed between and pivotally connected to the legs 25 and 26 of a respective bracket 24 by means of a pivot pin 50 extending through the aligned openings 28 thereof and an aperture formed through the piston rod portion disposed between the legs 25, 26. Pressure fluid for the hydraulic system is furnished by an electrically driven pump (not shown). Conduit means which includes conduit 51, partially shown in FIGURE 1 operatively interconnect the pump and the lower end of the cylinders 47. Valve means (not shown) are provided for controlling the admission of fluid under pressure to the cylinders 47 and the exhausting of the fluid from the cylinders 47 and directing the fluid to a reservoir (not shown) whereby the piston heads 48 can be moved vertically with respect to the cylinders 47. The electrically driven pump, reservoir and valve means are preferably enclosed in a compact housing which is secured to the underside of the vehicle body adjacent the rear end thereof on one side. Suitable manually operated control means 52 may be employed for conditioning the valve means and controlling operation of the pump. From the foregoing, it will be appreciated that vertical movement of the piston rods 49 upwardly as when fluid pressure from the pump is directed to the cylinders 47 below the piston heads 49 will effect vertical upward movement of the end gate member 15 and similarly when the pump is not operating and valve means is conditioned such that the fluid in the cylinders 47 is in communication with the reservoir, the end gate will move vertically downwardly by its own weight and the fluid from the cylinders 47 will be exhausted to the reservoir.

In use of the combination load carrying platform and end gate 15 and the structure described hereinbefore associated therewith, all of which can be preassembled, at a factory, is substituted for the conventional end gate of the vehicle. The entire preassembled unit, with the exception of the electrically driven pumps, reservoir and valve means, is mounted on the truck body 12 merely by securing the flanges 32 to the side panels 13 by means of the eight bolt and lock nut means 34.

When the end gate member 15 is functioning as a conventional end gate to close the rear opening in the truck body 12, portions of the wall 17 abut the rearwardmost vertical edge of the floor 14 and the transversely inwardly extending projections 37, as illustrated in FIGURE 4 to completely seal the rear end body opening in a graintight manner. Unique quick releasable latch means, designated generally by numeral 53, is employed for locking the end gate member 15 in its raised, body-closing position. The latch means 53 includes a pair of elements 54, each of which is rigidly fastened to a respective end wall 18 of the end gate member 15 adjacent the rear end of the member 15 when in its fully open position, as shown in FIGURE 1. Each element includes an L-shaped extention 55 which projects above the plane of the wall 17 when the end gate member 15 is in the position shown in FIGURE 1 whereby the edge 56 of one leg 57 of the extention 55 is spaced and parallel to the wall 17 and the edge 56 and the wall 17 define parallel edges of a slot 58. The closed ends of the slots 58 are formed by the legs 59 of the extentions 55. Rigidly fastened to the flange 39 of each guide member 31 is a laterally inwardly projecting element 60 which has a vertical slot 61 formed therein. The slots 61 have their bottoms closed and the portions of the element 60 containing the slots are substantially in vertical alignment with the projections 37. Thus, when the end gate member 15 is in its fully raised, open position as shown in broken lines in FIGURE 2 and, thereafter, the end gate member 15 is pivoted about the shaft 21 to its vertical, body-closing position, as illustrated in FIGURE 6, the slots 58 of the elements 54 are each in vertical alignment with a slot 61 of a respective element 60. When the valve means is then conditioned to place the interior of the cylinders 47 in communication with the reservoir, the elements 54 and 60 will move vertically relatively to each other until the bottoms of slots 58 engage the bottoms of slots 61. In this position the elements 60 are confined between the legs 57 and the wall 17 of the end gate member 15 and the legs 59 of the elements 54, in turn, are confined by the edges of the elements 60 defining the slots 61. Consequently, the end gate 15 is locked in its body-closing position. In order to release the latch means 53, it is only necessary to condition the valve means to supply fluid pressure to the cylinders 47 to raise the end gate member 15 sufficiently so that the elements 54 are moved out of locking engagement with the elements 60. The end gate member 15 may then be pivoted to its horizontal, rearwardly extending position.

Emergency lock means are provided in the event the power actuating means should become inoperative and it is desired to use the motor vehicle as though equipped with a conventional end gate. Referring to FIGURE 10, it will be noted that each slide bar 29 is provided with a laterally extending aperture 63 therethrough which is adapted to register with an aperture 64 formed through web 38 of the guide member 31 associated therewith and a threaded recess 65 provided in the base plate 42 when the end gate member 15 is fully raised, as shown by broken lines in FIGURE 2. A lock member in the form of a conventional bolt 66 is then inserted in each pair of aligned apertures 63, 64 and threaded into the recess 65 aligned therewith to rigidly connect the slide bars 29 to the guide members 31. Now the end gate member 15 may be swung between a vertical body-closing position and a lowered, horizontal position and utilized as a conventional end gate even though the elevator feature of the end gate is incapacitated. The latch means for securing the end gate member 15 in its vertical, body-closing position when the emergency lock means are being utilized and the latch means 53 normally used cannot be employed, comprises a pair of L-shaped brackets 67, each of which is vertically spaced above an element 60 and rigidly secured to the flange 39 of a respective guide member 31. The longitudinally extending leg 68 of each bracket 67 is provided with an aperture 69. When the guide members 31 and the slide bars 29 are locked together as pointed out hereinbefore and the end gate 15 is in its body-closing position, as shown in FIGURE 6, the leg 59 of each extention 54 lies closely adjacent to one of the legs 68 and the aperture 69 of the leg 68 is in registration with an aperture 70 formed in the leg 59 of the adjacent extention 54. A latch pin, not shown, may then be inserted through each pair of aligned apertures 69, 70 to latch the end gate 15 in its body-closing position.

Inasmuch as hydraulic fluid is employed as the force transmitting medium for raising the end gate member 15 and since the viscosity of such fluids increases with a decrease in temperature, a pair of assisting springs 71, 72 are incorporated in each piston and cylinder assembly 41. The purpose of the springs 71, 72 is to impart an initial force to the piston heads 48 in addition to the force applied to the heads 48 by the weight of the end gate member 15 to facilitate exhausting of the cylinders 47 of fluid during the lowering operation. In other words, the speed at which the end gate 15 descends, depends upon the rate at which the fluid flows from the cylinders 47 to the reservoir and the rate at which the fluid exhausts from the cylinders 47 depends partially on the head or force applied to the fluid by the piston heads 48 and the viscosity of the fluid. By initially increasing the force applied to the fluid the fact that the fluid may be more viscous than normal and result in a sluggish lowering operation of the end gate member 15 is overcome. A helically-wound compression spring 71 is disposed in each cylinder 47 and has one end secured to the upper end of the cylinder, as shown in FIGURE 12. The opposite end of each spring 71 is adapted to be engaged by the top of a respective piston head 48 as the piston approaches the end of its power stroke. Further upward movement of the pistons to the end of their power strokes fully compresses the springs 71. When the pistons are at the end of their power strokes and the springs 71 are fully compressed, as shown in FIGURE 12, the slide bars 29 are in the position shown in FIGURES 6 and 10. It will be appreciated, that the biasing action of the springs 71 will function in conjunction with the weight of the end gate member 15 to force the fluid from the cylinders 47 immediately upon the conditioning of the valve means to establish fluid communication between the cylinders 47 and the reservoir.

Each helically-wound spring 72 encircles a respective piston rod 49 and is adapted to be supported on a radially extending seat formed on the lower end of the piston rod 49. As the lower end of the piston rod 49 is raised during the elevating operating of the end gate member 15 the springs 72 are brought into abutting engagement with the lower end walls of the cylinders 47. Like the springs 71, the springs 72 are fully compressed when the pistons are at the end of their power strokes. It will be appreciated, that inasmuch as each set of springs 71, 72 perform the same function and the force imparted by each set is added to the force imparted to the piston heads 48 by the weight of the end gate member 15, either spring set 71, 72 could be eliminated in a particular installation if it was determined that the biasing force of only one set of springs would result in efficient operation of the end gate member 15.

The piston and cylinder assemblies 41 and guide members 31 are preferrably enclosed by sheet metal housings 73 to render the installation more attractive. The housings 73 may be fastened to tabs 74 (one of which is shown in FIGURES 9 and 10) carried by the guide members 31 by means of bolt and nut means 75.

The embodiment of the invention chosen for the purposes of illustration and description herein is that preferred for achieving the objects of the invention and developing the utility thereof in the most desirable manner, due regard being had to existing factors of economy, simplicity of design and construction, production methods, and the improvements sought to be effected. It will be appreciated, therefore, that the particular structural and functional aspects emphasized herein are not intended to exclude, but rather to suggest, such other modifications and adaptations of the invention as fall within the spirit and scope of the invention as defined in the appended claims.

What is claimed is:

1. An elevating end gate structure for an automotive vehicle having a body with an open end and provided with laterally spaced, vertical side walls and a floor extending between said side walls, said floor being vertically spaced above the ground comprising, a pair of vertically disposed, elongated guide members, each of said guide members being position adjacent the end of a respective body side wall at the open end of the body; an elongated bar slidably mounted within each of said guide members for vertical movement with respect thereto; a combination load-carrying and end gate member pivotally connected to the lowermost ends of said bars adapted to be raised and lowered to and from the level of said floor while disposed in a substantially horizontally extending position upon relative sliding movement of said guide members and bars, and moved into a vertical position to close the open end of the body; power actuating means for sliding said bars upwardly with respect to said guide members including a pair of vertically disposed fluid pressure piston and cylinder assemblies, each of said piston and cylinder assemblies having one end pivotally attached to the uppermost end of a respective guide member and its opposite end pivotally attached to the lowermost end of a respective bar; and means for mounting said guide members, bars, piston and cylinder assemblies and load-carrying and end gate member as a pre-assembled unit on said body including a pair of vertical, longitudinally extending mounting flanges, each of said flanges being fixed to a respective guide member and being adapted to abut the inner surface of a respective side wall of the body adjacent the open end thereof, the lowermost end of each of said flanges resting upon said body floor and a plurality of vertically spaced nut and bolt means for rigidly connecting each flange to a respective side wall of the body.

2. An elevating end gate structure as set forth in claim 1, including a vertical laterally inwardly extending projection fixed to each guide member, said projections lying substantially in a vertical plane containing the edge of the floor at the open end of the body and extending vertically from said body floor and having a height substantially equal to the height of said body side walls whereby said load-carrying and end gate member abuts said projections and the edge of the floor at the open end of the body when in its raised and vertical position in a grain-tight manner.

3. An elevating end gate structure for an automotive vehicle having a body providing with a horizontal floor vertically spaced above the ground comprising, a pair of vertically disposed elongated channel-like guide members, each of said guide members being adjacent to and secured to a respective side of the body at one end thereof, the web of each of said guide members lying in vertical, longitudinally extending planes and being provided with an aperture therethrough adjacent the upper end thereof; an elongated bar slidably mounted within each of said guide members for vertical movement with respect thereto, each of said bars having an aperture therethrough registerable with an aperture of a respective guide member; a combination load carrying and end gate member pivotally connected to the lowermost ends of said bars adapted to be raised and lowered to and from the level of said floor while disposed in a substantially horizontally extending position upon relative sliding movement of said guide members and bars and moved into a vertical position with respect to said bars, said apertures of said bars being in registration with the apertures of said guide members when said load-carrying and end gate member is at the level of said floor; a pair of vertically disposed power actuating means for sliding said bars relatively to said guide members; means operatively interconnecting said power actuating means and said guide members and bars including a support bracket fixed to each guide member having an end of a respective power actuating means pivotally attached thereto, each of said brackets including a base plate having a threaded recess formed therein positioned in alignment with the aperture of a respective guide member; and a pair of threaded elements, each of said elements being insertable through a respective pair of registering apertures of said bars and guide members and threadable in a recess of a respective base plate to lock said bars to said guide members.

4. An elevating end gate structure for an automotive vehicle having a body provided with an open rear end and with laterally spaced, vertical side walls and a floor extending between said side walls, said floor being vertically spaced above the ground comprising, movable support means operatively connected to said body for relative vertical movement; power actuating means operatively connected to said body and support means for moving said support means vertically upward with respect to said body; a combination load-carrying and end gate member having one laterally extending edge pivotally connected to said support means adapted to be raised and lowered to the level of said floor while disposed in a substantially horizontal rearwardly extending position upon relative vertical movement of said support means and body and pivoted about a horizontal, transversely extending axis with respect to said support means to a vertical position to close the rear end of said body; and quick releasable latch means for locking said member in its vertical position to said body comprising a pair of first latch elements fixed to said body at transversely spaced and aligned points lying substantially in a transversely extending vertical plane containing the rearwardmost edge of the body floor and a pair of second latch elements fixed to said member adjacent the lateral edge thereof remote from the pivotal axis, each of said second latch elements being adapted to operatively engage a respective first latch element to lock said member to said body, said second latch elements being effective to operatively engage said first latch elements only when said second latch elements are moved vertically downwardly toward said first latch elements from above by movement of said load-carrying and end gate member vertically downwardly with respect to said floor when in its vertical position.

5. An elevating end gate structure for an automotive vehicle having a body provided with an open rear end and with laterally spaced, vertical side walls and a floor extending between said side walls, said floor being vertically spaced above the ground comprising, a pair of vertically disposed, elongated channel-like guide members, each of said guide members being adjacent to and secured to a respective side wall of said body at the rear end thereof; an elongated bar slidably mounted within each of said guide members for vertical movement with respect thereto; power actuating means for sliding said bars relatively to said guide members a generally rectangular combination load-carrying and end gate member pivotally connected to the lowermost ends of said bars adapted to be raised and lowered to and from the level of said floor while disposed in a substantially horizontal, rearwardly extending position upon relative sliding movement of said guide members bars and moved into a vertical position with respect to said bars; and quick releasable latch means for locking said end gate member in its vertical position to said body to close the open rear end thereof comprising a pair of first latch elements, each of said first latch elements being secured to a respective guide member and having a portion thereof projecting laterally inwardly, said portions lying in a transversely extending vertical plane containing the rear edge of said floor, said releasable latch means further including a pair of second latch elements fixed to said end gate member adjacent the lateral edge thereof remote from the pivotal axis, each of said second latch elements being adapted to operatively engage a respective first latch element to lock said end gate member to said body, said second latch elements being effective to operatively engage said first latch elements only when said second latch elements are moved vertically downwardly toward said first latch elements from above by movement of said end gate member vertically downwardly with respect to said floor when in its vertical position.

6. An elevating end gate structure as set forth in claim 5, wherein said portions of said first latch elements projecting laterally inwardly are each provided with a vertical slot, the upper end of each slot being open, and each of said second latch elements includes an L-shaped extension, one leg of each extension extending horizontally forwardly and the other leg thereof extending vertically downwardly from a flat surface of said end gate when said end gate member is in its vertical position, said first and second latch elements being in operative engagement to lock said end gate in its vertical position when said horizontal forwardly extending leg of each second latch element is disposed within a slot of a respective first latch element and said laterally inwardly projecting portion of each first latch element is confined between the vertically downwardly extending leg of a respective second latch element and said flat surface of said end gate member.

References Cited in the file of this patent

UNITED STATES PATENTS

| | | |
|---|---|---|
| 344,038 | Fitts | June 22, 1886 |
| 586,641 | Underwood | July 20, 1897 |
| 660,479 | Wright | Oct. 23, 1900 |
| 671,987 | Wall | Apr. 16, 1901 |
| 2,124,857 | MacGrath | July 26, 1938 |
| 2,706,565 | Krasno | Apr. 19, 1955 |